United States Patent
Woo et al.

(10) Patent No.: US 8,102,160 B2
(45) Date of Patent: Jan. 24, 2012

(54) SATURATION PREVENTING POWER FACTOR IMPROVING METHOD AND APPARATUS

(75) Inventors: Won-myung Woo, Seoul (KR); Jin-hyung Lee, Anyang-si (KR); Kyoung-geun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 787 days.

(21) Appl. No.: 11/937,739

(22) Filed: Nov. 9, 2007

(65) Prior Publication Data

US 2008/0265847 A1 Oct. 30, 2008

(30) Foreign Application Priority Data

Apr. 26, 2007 (KR) .................. 10-2007-0040938

(51) Int. Cl.
*G05F 1/12* (2006.01)
(52) U.S. Cl. .................. 323/249; 323/302; 323/908
(58) Field of Classification Search .................. 323/249, 323/254, 259, 266, 290, 301, 302, 901, 908
See application file for complete search history.

(56) References Cited

U.S. PATENT DOCUMENTS

| | | | | |
|---|---|---|---|---|
| 5,420,780 A | * | 5/1995 | Bernstein et al. | 323/908 |
| 6,487,098 B2 | * | 11/2002 | Malik et al. | 323/908 |
| 6,836,102 B2 | * | 12/2004 | Sudou | 323/282 |
| 7,068,016 B2 | * | 6/2006 | Athari | 323/222 |
| 7,379,311 B2 | * | 5/2008 | Shih | 323/908 |
| 7,420,827 B2 | * | 9/2008 | Ingman | 323/908 |
| 7,427,855 B2 | * | 9/2008 | Huang | 324/117 R |
| 2005/0201124 A1 | | 9/2005 | Lanni | |

FOREIGN PATENT DOCUMENTS

| | | |
|---|---|---|
| CN | 2907074 Y | 5/2007 |
| JP | 2000-023452 A | 1/2000 |
| JP | 2002-051563 A | 2/2002 |
| JP | 2005-253284 A | 9/2005 |
| KR | 10-2005-0039600 A | 4/2005 |
| KR | 1020070040742 A | 4/2007 |

OTHER PUBLICATIONS

Office Action issued on Mar. 15, 2010 in counterpart Chinese Application No. 200810003980.5.

Communication dated Feb. 23, 2011 from the State Intellectual Property Office of P.R. China in a counterpart application No. 200810003980.5.

* cited by examiner

*Primary Examiner* — Jessica Han
(74) *Attorney, Agent, or Firm* — Sughrue Mion, PLLC

(57) ABSTRACT

Provided are a method and apparatus for improving the power factor of an input power. The apparatus includes an input unit receiving the input power, a power factor correction unit correcting the power factor of the input power applied to the input unit, and a saturation prevention unit controlling the power factor correction unit such that the corrected power does not exceed a set power limit.

21 Claims, 7 Drawing Sheets

SATURATION PREVENTING POWER FACTOR IMPROVING METHOD AND APPARATUS

CROSS-REFERENCE TO RELATED PATENT APPLICATION

This application claims priority from Korean Patent Application No. 10-2007-0040938, filed on Apr. 26, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to correcting the power factor of input power, and more particularly, to correcting the power factor of input power in a switching mode power supply (SMPS).

2. Description of the Related Art

Related art power supply units are not suitable for household and industrial apparatuses having a small size and weight and a large capacity because the Related art power supply units have a limited capacity and a considerably large size and weight. Accordingly, an SMPS has been proposed.

The SMPS is widely used for an AC/DC converter, a DC/DC converter, a power supply unit for notebook computers and a power supply unit for mobile phones. The SMPS employs a power factor improvement circuit in order to increase the power efficiency. The power factor improvement circuit removes harmonics of an input current and makes the phases of the current and voltage of an input power correspond to each other to improve the power efficiency when an AC power is applied as the input power.

The power factor improvement circuit uses a storage element such as a capacitor or an inductor, which has a rated capacity with respect to an allowable current and voltage. When a current or a voltage that exceeds the rated capacity is applied to the capacitor or the inductor, the capacitor or the inductor loses magnetism or a dielectric thereof is damaged, and thus the capacitor or the inductor loses its operational function.

FIG. 1 is a block diagram of a related art power factor improving apparatus. Referring to FIG. 1, the related art power factor improving apparatus includes an input unit 110, a rectifier 120, a power supply unit 130, a power factor correction unit 140, and a converter 150.

The input unit 110 receives an AC power. The rectifier 120 full-wave-rectifies the AC power input to the input unit 110. The rectifier 120 is configured in the form of a bridge circuit using four diodes.

The power supply unit 130 receives the AC power and outputs a DC voltage for operating the power factor correction unit 140. The voltage output from the power supply unit 130 can be a standby voltage.

The power factor correction unit 140 improves the power factor of the AC power input to the input unit 110 and includes a signal generator 142, a switch 144, an inductor 146, a diode 147 and a capacitor 148.

A DC output voltage 141 of the power supply unit 130 is applied to the signal generator 142 of the power factor correction unit 140 to operate the signal generator 142. When a DC output voltage 141 higher than a predetermined threshold is applied to the signal generator 142, the signal generator 142 outputs a control signal 143 for improving the power factor of the AC power input to the input unit 110. The control signal 143 is a pulse signal and the pulse width of the control signal 143 is adjusted to control the operation of the switch 144. The pulse width of the control signal 143 is controlled such that the capacitor 148 stably maintains a target DC voltage with reference to various signals including the input power and a feedback signal 149 from the voltage of the capacitor 148.

The control signal 143 output from the signal generator 142 operates the switch 144. The switch 144 can be configured in the form of a field effect transistor (FET). The control signal 143 is applied to the gate of the FET. When the control signal 143 is in an ON state, the FET operates and thus the switch 144 is closed. Accordingly, a current path is formed through the input unit 110, the inductor 146 and the FET 144. When the control signal 143 is in an OFF state, the FET does not operate and thus the switch 144 is opened. Accordingly, a current path is formed through the input unit 110, the inductor 146, the diode 147 and the capacitor 148.

When the control signal 143 is in an ON state and thus the switch 144 is closed, energy from the input AC power is charged in the inductor 146. When the control signal 143 is in an OFF state and thus the switch 144 is opened, the capacitor 148 is charged with a voltage using the energy charged in the inductor 146. The converter 150 converts the voltage charged in the capacitor 148 into a desired target voltage and transfers the target voltage to a load.

FIG. 2 illustrates the operation of the related art power factor improving apparatus. (a) of FIG. 2 is a waveform diagram of an input AC voltage. Referring to (a) of FIG. 2, the input AC voltage is applied to the power factor improving apparatus for a time T0 through T1 and then the supply of the input AC voltage is cut for a time T2. Subsequently, the input AC voltage is applied again for a time T3 through T4. This frequent ON/OFF conversion of the input AC voltage can be caused by the power supply or a forced operation of a user.

(b) of FIG. 2 illustrates the output of the power supply unit 130. Referring to (b) of FIG. 2, when the input AC voltage is applied to the power supply unit 130, the power supply unit 130 converts the input AC voltage into a DC voltage and outputs a voltage Vcc 141 in order to operate the power factor correction unit 140.

When the input AC voltage is applied, the voltage Vcc is gradually increased and then maintained. The voltage Vcc 141 gradually varies because of a storage element included in the power supply unit 130, such as a capacitor or an inductor. When the supply of the input AC voltage is cut, the voltage Vcc 141 is gradually reduced to 0V. When the voltage Vcc 141 becomes lower than a predetermined threshold value, the operation of the power factor correction 140 is stopped.

During the period T0 through T1, the input AC voltage is applied to the power supply unit 130, and thus the power supply 130 outputs the DC voltage Vcc. The DC voltage Vcc is input to the power factor correction unit 140 to operate the power factor correction unit 140.

During the period T2, the supply of the input AC voltage is cut. However, the DC voltage Vcc output from the power supply unit 130 may be higher than a threshold voltage for a predetermined time even when the input AC voltage is not applied because energy stored in the storage element included in the power supply unit 130 gradually decreases with time. Accordingly, the power factor correction unit 140 continuously operates during the time when the DC voltage Vcc output from the power supply unit 130 is higher than the threshold voltage even when the AC input voltage is not applied for the period T2.

The DC voltage Vcc output from the power supply unit 130 gradually increases to a predetermined level for the period T3 through T4 during which the input AC voltage is applied again.

(d) of FIG. 2 illustrates the control signal 143 generated by the signal generator 142. The control signal 143 is a pulse signal that controls ON/OFF operations of the switch 144. The signal generator 142 receives the output voltage Vcc of the power supply unit 130, generates the control signal 143, and transfers the control signal 143 to the switch 144 only when the output voltage Vcc of the power supply unit 130 is higher than the predetermined threshold value. When the output voltage Vcc of the power supply unit 130 is lower than the predetermined threshold value, the signal generator 142 does not operate.

The signal generator 142 controls the pulse width of the control signal 143 on the basis of the input AC voltage and the output voltage 149 of the capacitor 148 such that the output voltage 149 of the capacitor 148 reaches a target voltage.

During the period T0, the pulse width of the control signal 143 generated by the signal generator 142 is gradually increased. The switch 144 is closed and thus the inductor 146 is charged when the control signal 143 is in an ON state while the switch 144 is opened and thus the energy charged in the inductor 146 is transferred to the capacitor 148 when the control signal 143 is in an OFF state.

If the control signal 143 of the signal generator 142 maintains the ON state for a long time, the switch 144 is closed for a long time and thus a large current flows to the inductor 146. The control signal 143 controls the output voltage 149 of the capacitor 148 to be maintained at a specific level based on the output voltage 149 of the capacitor 148 and the AC input voltage.

Since there is a large difference between the output voltage 149 of the capacitor 148 and the target voltage when the power factor correction unit 140 initially operates, the signal generator 142 generates the control signal 143 having a large pulse width such that the control signal 143 maintains the ON state for a long time. Accordingly, a large current flows to the inductor 146, and thus the inductor 146 is saturated. Consequently, the switch 144 is damaged and the power factor correction unit 140 cannot normally operate.

To solve this problem, the signal generator 142 can perform a soft-start operation that gradually increases a time for which the switch 144 is closed or can perform a start-up operation that starts the switch 144 after the output voltage 149 of the capacitor 148 has increased to a specific level when the power factor correction unit 140 initially operates. In the case of the power factor improving apparatus illustrated in FIG. 1, the signal generator 142 selects the soft-start operation to generate the control signal 143 having a pulse width that gradually increases for the period T0 when the power factor correction unit 140 initially operates.

During the period T1, the input AC voltage is applied and the power supply unit 130 converts the input AC voltage into the DC voltage Vcc and the transfers the DC voltage Vcc to the signal generator 142, and thus the power factor correction unit 140 operates. During the period T1, the output signal 149 of the capacitor 148 stably maintains a specific value.

During the period T2, the supply of the input AC voltage is cut, and thus the output DC voltage Vcc of the power supply unit 130 decreases. Here, the output DC voltage Vcc gradually decreases due to the storage element included in the power supply unit 130, such as a capacitor or an inductor, as described above. The output DC voltage Vcc of the power supply unit 130 is still higher than the predetermined threshold value, and thus signal generator 142 continuously operates. However, the output voltage 149 of the capacitor 148 continuously decreases even when the control signal 143 of the signal generator 142 is in an ON state because the input AC voltage is not applied. The signal generator 142 receives the output voltage 149 of the capacitor 148 and determines that there is a large difference between the output voltage 149 of the capacitor 148 and the target voltage. Accordingly, the signal generator 142 generates the control signal 142 to have a large pulse width in order to charge the capacitor 148 with the target voltage.

At the period T3, the input AC voltage is applied again. When the time during which the input AC voltage is cut and then applied again is short, the output DC voltage Vcc of the power supply unit 130 does not become lower than the predetermined threshold value and gradually increases again.

The signal generator 142 receives the output voltage 149 of the capacitor 148 through feedback and determines that there is a large difference between the output voltage 149 of the capacitor 148 and the target voltage, and thus the signal generator 142 generates the control signal 143 having a large pulse width in order to charge the capacitor 148 with the target voltage. When the signal generator 142 generates the control signal 143 having a large pulse width, the current flowing through the inductor 146 increases. When a current that exceeds the rated capacity of the inductor flows through the inductor 146, the inductor 146 loses magnetism and is saturated. At the same time, a large current flows to the switch 144 and damages the switch 144.

After the period T4, the switch 144 is damaged, and thus the power factor correction unit 140 loses the function thereof and the output voltage 149 of the capacitor 148 decreases.

(d) of FIG. 2 illustrates the output voltage 149 of the capacitor 148. During the period T0, the output voltage 149 of the capacitor 148 gradually increases. As described above with reference to FIG. 1, the capacitor 148 is charged using the energy charged in the inductor 146 when the control signal 143 generated by the signal generator 142 is in an OFF state and the switch 144 is opened.

During the period T1, the input AC voltage is applied and the output voltage 149 of the capacitor 148 is stably maintained.

During the period T2 when the supply of the input AC voltage is cut, the output voltage 149 of the capacitor 148 gradually decreases because the input AC voltage is not applied even when the signal generator 142 operates.

At the period T3, the input AC voltage is applied again and a large current flows to the capacitor 148 because the signal generator 142 generates the control signal 143 that maintains an ON state for a long time. Accordingly, the output voltage 149 of the capacitor 148 rapidly increases. However, when the quantity of current flowing through the inductor 146 exceeds the rated capacity of the inductor 146, the inductor 146 loses magnetism and a large current flows to the switch 144 and damages the switch 144.

After the period T4, the switch 144 does not operate, and thus the power factor correction unit 140 does not operate and the output voltage 149 of the capacitor 148 gradually decreases.

To solve this problem, the related art power factor improving circuit uses an inductor having a high capacity or an inductor made of an expensive material such as a powder type magnetic substance that is difficult to saturate. This increases the size and cost of a power supply unit employing the power factor improving circuit.

SUMMARY OF THE INVENTION

Exemplary embodiments of the present invention overcome the above disadvantages and other disadvantages not described above. In addition, the present invention is not required to overcome the disadvantages described above, and an exemplary embodiment of the present invention may not overcome any of the problems described above.

The present invention provides a method and apparatus for improving, at low cost, the power factor of power input to a power supply unit, which prevent an element such as an inductor or a switch from saturation in the power supply unit including a power factor improvement circuit to enhance the stability of the power factor improvement circuit.

According to an aspect of the present invention, there is provided a power factor improving apparatus including an input unit receiving an input power; a power factor correction unit correcting the power factor of the input power applied to the input unit; and a saturation prevention unit controlling the power factor correction unit such that the power factor correction unit does not exceeds a set limit.

The input power may be an AC voltage.

The power factor improving apparatus may further include a power supply unit providing an operating power to the power factor correction unit.

The power factor improving apparatus may further include a rectifier rectifying the input power.

The power factor correction unit may include a first storage unit connected to an output terminal of the input unit; a second storage unit connected to an output terminal of the first storage unit; and a switch performing a switching operation for storing energy in the first storage unit and the second storage unit in response to a switching control signal input from an external device.

The switch may allow energy of the input power applied to the input unit to be stored in the first storage unit when the switching control signal is a first switching control signal and allows energy of the input power applied to the input unit to be stored in the second storage unit using the energy charged in the first storage unit when the switching control signal is a second switching control signal.

The first storage unit may be an inductor and the second storage unit may be a capacitor.

When the amplitude of a current transferred to the first storage unit and the second storage unit is higher than the rated capacities of the first storage unit and the second storage unit, the saturation prevention unit may block the current from being transferred to the first storage unit and the second storage unit.

The saturation prevention unit may include an input detector detecting whether the input power is currently applied to the input unit; and a controller controlling the power factor correction unit to selectively operate according to the detecting of the input power by the input detector.

The controller may control the power factor correction unit to operate when the input detector detects the input power is currently applied.

The power factor improving apparatus may further include a power converter connected to an output terminal of the power factor correction unit and converting a DC output voltage of the power factor correction unit into a predetermined voltage.

According to another aspect of the present invention, there is provided a power factor improving method including receiving an input power; correcting the power factor of the input power; and controlling the correcting of the power factor such that the corrected power does not exceed a set limit.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
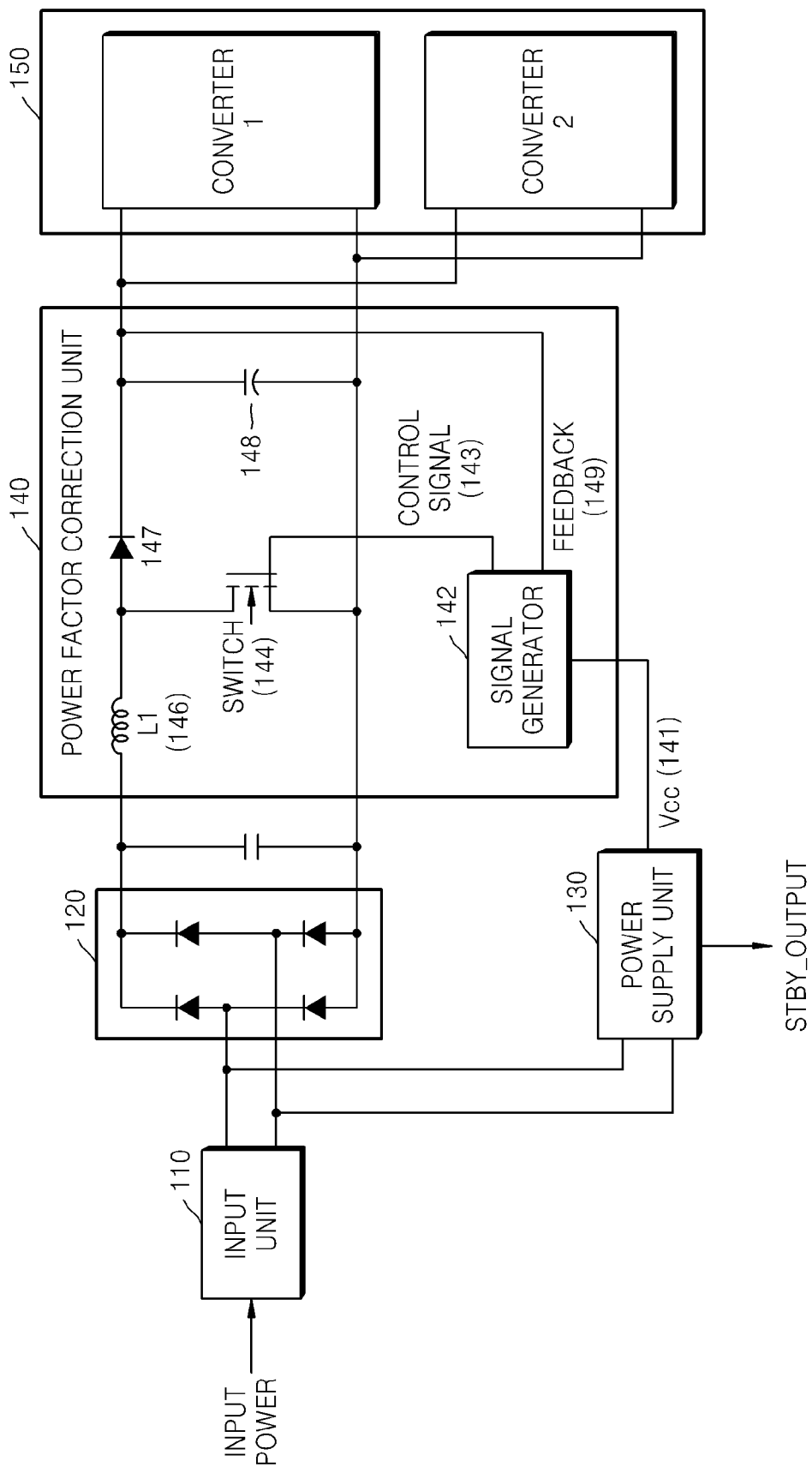
FIG. 1 is a block diagram of a related art power factor improving apparatus.
Figure 2:
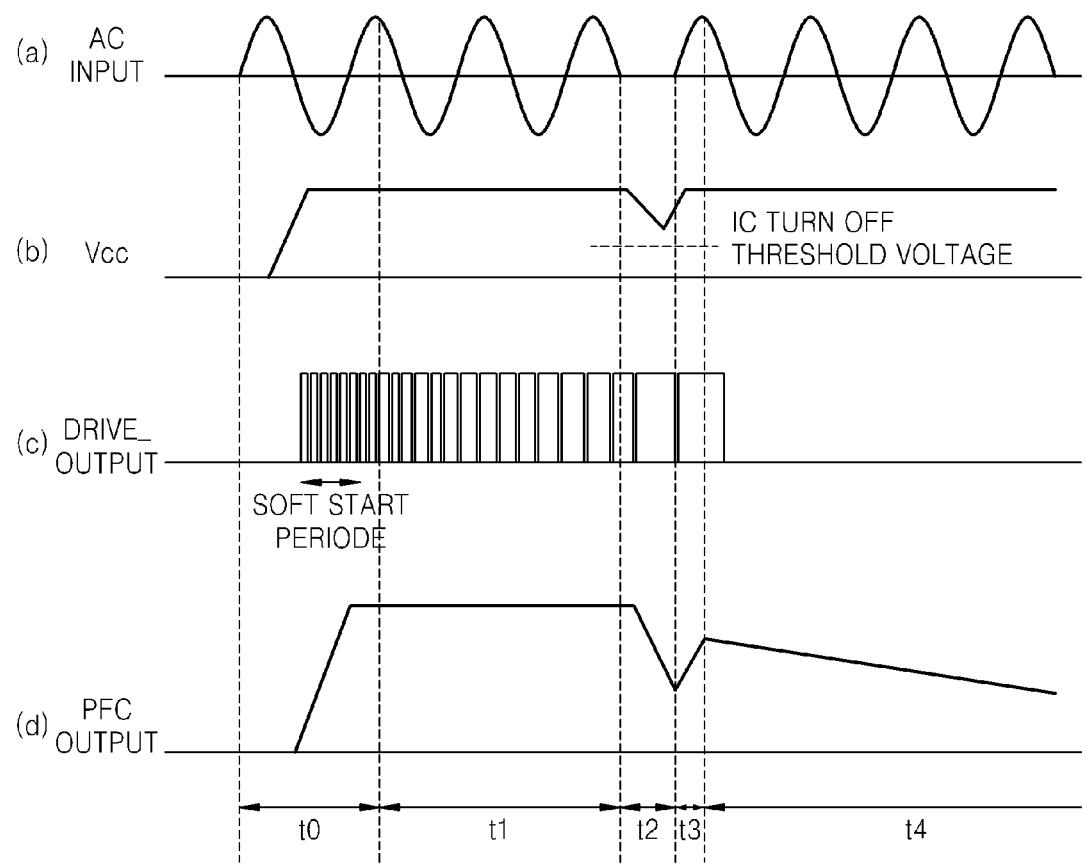
FIG. 2 illustrates signal waveforms for explaining the operation of the related art power factor improving apparatus.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Throughout the drawings, like reference numerals refer to like elements.

Figure 3:
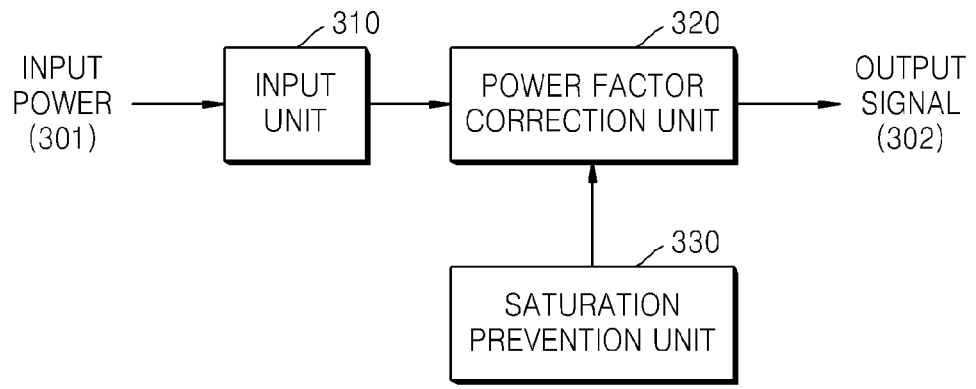
FIG. 3 is a block diagram of a power factor improving apparatus for preventing saturation according to an exemplary embodiment of the present invention.

FIG. 3 is a block diagram of a power factor improving apparatus for preventing saturation according to an exemplary embodiment of the present invention. Referring to FIG. 3, the power factor improving apparatus includes an input unit 310, a power factor correction unit 320, a saturation prevention unit 330, and a power supply unit (not shown).

The input unit 310 receives an input power 301. While the input power 301 is an AC power in the present exemplary embodiment, it is not limited thereto. The AC power can be rectified by a rectifier (not shown) and input to the input unit 310.

The power factor correction unit 320 corrects the power factor of the input power 301 applied to the input unit 310. The power factor correction unit 320 minimizes a phase difference between the voltage and current of the input power to restrain a power loss and outputs a specific DC voltage. The power factor correction unit 320 will be explained later in detail with reference to FIG. 4.

The saturation prevention unit 330 controls the input power transferred to the power factor correction unit 330 such that the input power does not exceed the rated capacities of elements included in the power factor correction unit 320. While the saturation prevention unit 330 controls the input power in such a manner that the saturation prevention unit 330 blocks the power supplied to the power factor correction unit 320 in the present exemplary embodiment, the saturation prevention unit 330 can directly control the operation of the power factor correction unit 320 to control the input power transferred to the power factor correction unit 320. The saturation prevention unit 330 will be explained later in more detail with reference to FIG. 6.

The power supply unit (not shown) is connected to the power factor correction unit 320 and provides an operating power to the power factor correction unit 320. When the input power applied to the input unit 310 is an AC voltage, the power supply unit (not shown) can be designed such that it converts the AC voltage into a DC voltage and transfers the DC voltage to the power factor correction unit 320 to operate the power factor correction unit 320.

Figure 4:
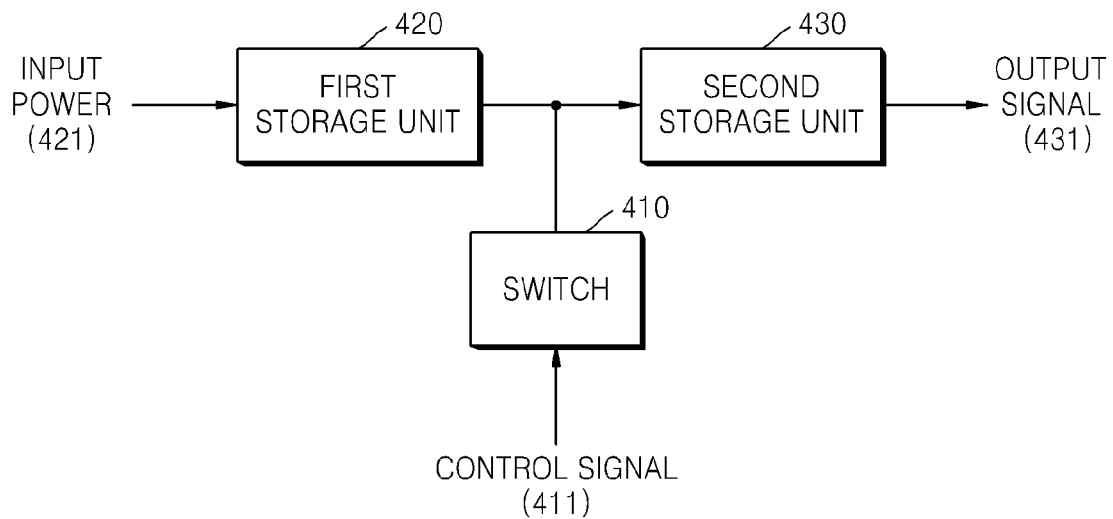
FIG. 4 is a block diagram of a power factor improving unit of the power factor improving apparatus according to an exemplary embodiment of the present invention.

FIG. 4 is a block diagram of a power factor correction unit of the power factor correction apparatus illustrated in FIG. 3 according to an exemplary embodiment of the present invention. Referring to FIGS. 3 and 4, the power factor correction unit includes a switch 410, a first storage unit 420 and a second storage unit 430. The switch 410 receives a control signal 411 from an external device and controls the operation of the power factor correction unit 320. The control signal 411 can be a pulse signal. In this case, the pulse signal 411 can control the switch 410 in such a manner that the switch 410 is closed when the pulse signal 411 is in an ON state and the switch 410 is opened when the pulse signal 411 is in an OFF state.

The first storage unit 420 stores energy using an input power 421 applied to the input unit 310 when the switch 410 is closed. The second storage unit 430 receives energy from the first storage unit 420 and stores the energy. When the switch 410 is opened, the second storage unit 430 receives and stores the energy stored in the first storage unit 420. The energy stored in the second storage unit 430 can be a DC voltage and the DC voltage can be output as an output signal 431.

Figure 5:
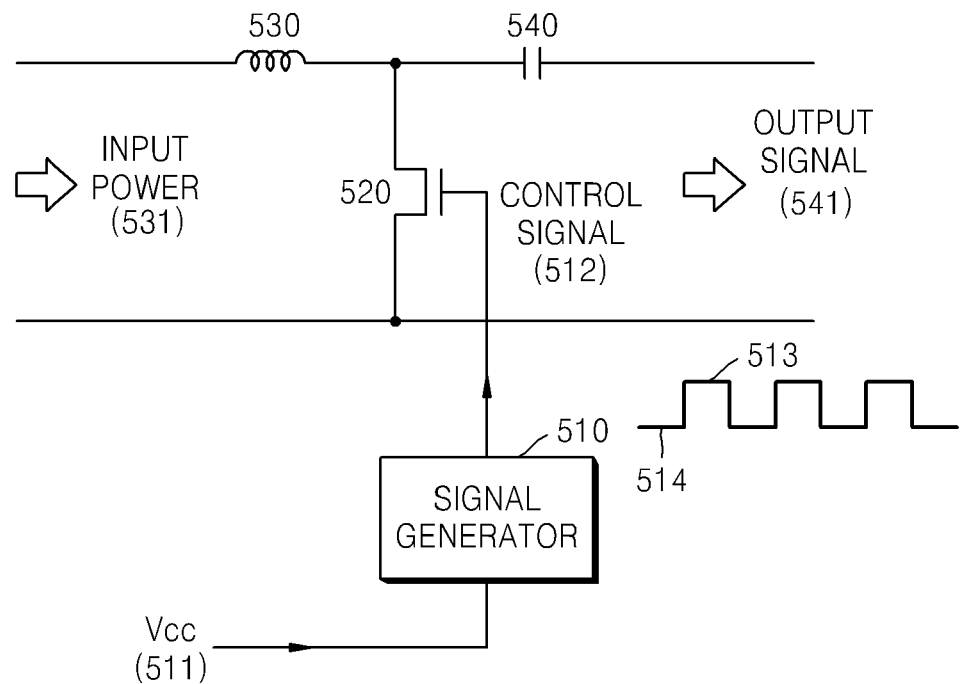
FIG. 5 illustrates a power factor correction unit of the power factor improving apparatus according to an exemplary embodiment of the present invention.

FIG. 5 illustrates the power factor correction unit of the power factor improvement apparatus illustrated in FIG. 3 according to an exemplary embodiment of the present invention. Referring to FIG. 5, the power factor correction unit includes a signal generator 510, a field effect transistor (FET) 520, an inductor 530, and a capacitor 540. The signal generator 510 receives a voltage Vcc 511 from the power supply unit (not shown) and generates a control signal 512. The control signal 512 can be a pulse signal. The signal generator 510 generates the control signal 512 based on an input power 531 and an output signal 541 of the capacitor 540. When there is a large difference between the output signal 541 of the capacitor 540 and a target voltage, the signal generator 510 generates the control signal 512 having a large pulse width.

The FET 520 receives the control signal 512 through its gate and determines whether to operate or not according to the control signal 521. When the control signal 512 is in an ON state 513, a sufficient voltage to operate the FET 520 is applied to the gate of the FET 520, and thus the FET 520 is short-circuited. When the control signal 512 is in an OFF state 514, a sufficient voltage to operate the FET 520 is not applied to the gate of the FET 520, and thus the FET 520 is opened.

The inductor 530 is charged with energy from the input power 531 according to whether the FET 520 operates or not. When the FET 520 is short-circuited, a current path is formed through the inductor 530, the FET 520 and the input unit 310 (illustrated in FIG. 3) and a current flowing through the inductor 530 increases according to the input power 531. In this case, the energy charged in the inductor 530 is proportional to square of the current.

The capacitor 540 is charged with energy from the inductor 530 according to whether the FET 520 operates or not. When the FET 520 is opened, a current path is formed through the inductor 530, the capacitor 540 and the input unit 310 (illustrated in FIG. 3). The energy stored in the inductor 530 is transferred in the form of current to the capacitor 540, and the capacitor 540 stores the energy. The energy stored in the capacitor 540 is proportional to square of the voltage charged in the capacitor 540. The capacitor 540 can output the charged voltage as the output signal 541.

Figure 6:
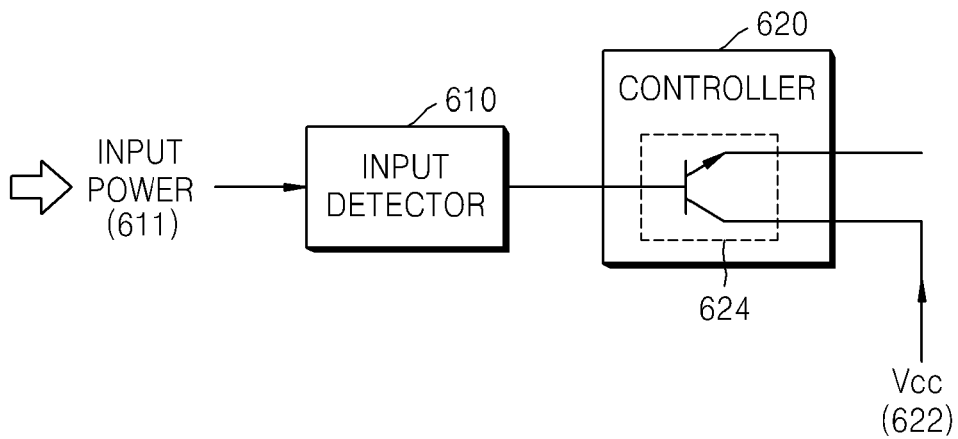
FIG. 6 is a block diagram of a saturation prevention unit of the power factor improving apparatus according to an exemplary embodiment of the present invention.

FIG. 6 is a block diagram of the saturation prevention unit of the power factor improvement apparatus illustrated in FIG. 3 according to an exemplary embodiment of the present invention. Referring to FIG. 6, the saturation prevention unit includes an input detector 610 and a controller 620.

The input detector 610 determines whether an input power 611 is applied to the input unit 310 (illustrated in FIG. 3). The input detector 610 can be constructed in various manners. For example, the input detector 610 can be constructed using an AC-DC converter and a comparator when the input power 611 is an AC voltage. The AC-DC converter converts the input AC voltage into a DC voltage. The comparator compares the DC voltage to a predetermined threshold voltage and determines that the input power is applied when a time for which the DC voltage, which is higher than the threshold voltage, is applied to the input detector 610 is longer than a predetermined time.

The controller 620 controls the operation of the power factor correction unit 320 illustrated in FIG. 3 according to the determination result of the input detector 610. That is, the controller 620 controls the power factor correction unit 320 such that the power factor correction unit 320 selectively operates according to whether the input detector 610 detects an input power 611.

The controller 620 can be configured in the form of an NPN bipolar junction transistor (BJT) 624. A BJT operating voltage is applied to a base of the BJT 624 according to the determination result of the input detector 610. That is, the input detector 610 outputs a voltage higher than the BJT operating voltage when the input detector 610 determines that the input power 611 is applied and outputs a voltage lower than the BJT operating voltage or outputs no voltage when it is determined that the input power 611 is not applied.

A collector of the BJT 624 receives an output DC voltage 622 of the power supply unit (not shown). The power supply unit (not shown) receives the input power 611, converts the input power 611 into a DC voltage and outputs the DC voltage 622. As described above, the power supply unit (not shown) includes a capacitor or an inductor, and thus the output of the DC voltage 622 from the power supply unit is not immediately stopped even when the input power 611 is cut.

When the input power 611 is applied, the output DC voltage 622 of the power supply unit (not shown) is input to the collector of the BJT 624. In this case, a voltage higher than the BJT operating voltage is applied to the base of the BJT, and thus the output DC voltage 622 passes through the emitter of the BJT 624 and is transferred to the power factor correction unit 320 illustrated in FIG. 3. Accordingly, the power factor correction unit 320 operates.

When the input power 611 is not applied, the BJT 624 does not operate because the voltage higher than the BJT operating voltage is not applied to the base of the BJT 624 even when the output DC voltage 622 of the power supply unit (not shown) is input to the collector of the BJT 624. Accordingly, the output DC voltage of the power supply unit (not shown) is not transferred to the power factor correction unit 320.

The controller 620 can be configured in the form of a PNP BJT. In this case, the output DC voltage 622 of the power supply unit (not shown) is applied to the emitter of the PNP BJT and the output terminal of the controller 620 corresponds to the collector of the PNP BJT. When the input power 611 is applied to the input detector 610, a logic low signal is transferred to the base of the PNP BJT such that the output DC voltage of the power supply unit (not shown) passes through the emitter of the BJT and is transferred to the power factor correction unit 320. When the input power 611 is cut, a logic high signal is applied to the base of the BJT, and thus the BJT does not operate. Accordingly, the output DC voltage 622 of the power supply unit (not shown) does not pass through the emitter of the BJT.

According to the present exemplary embodiment of the present invention, even when the input power 611 is cut and then supplied again, a soft-start operation or a start-up operation, as described above, is performed in order to prevent the power factor correction unit 320 from recognizing the re-supply of the input power as initialization of the operation of the power factor improving apparatus and to prevent providing an excessive current to control the power factor correction unit 320 such that a component included in the power factor correction unit 320 does not exceed a rated capacity.

Figure 7:
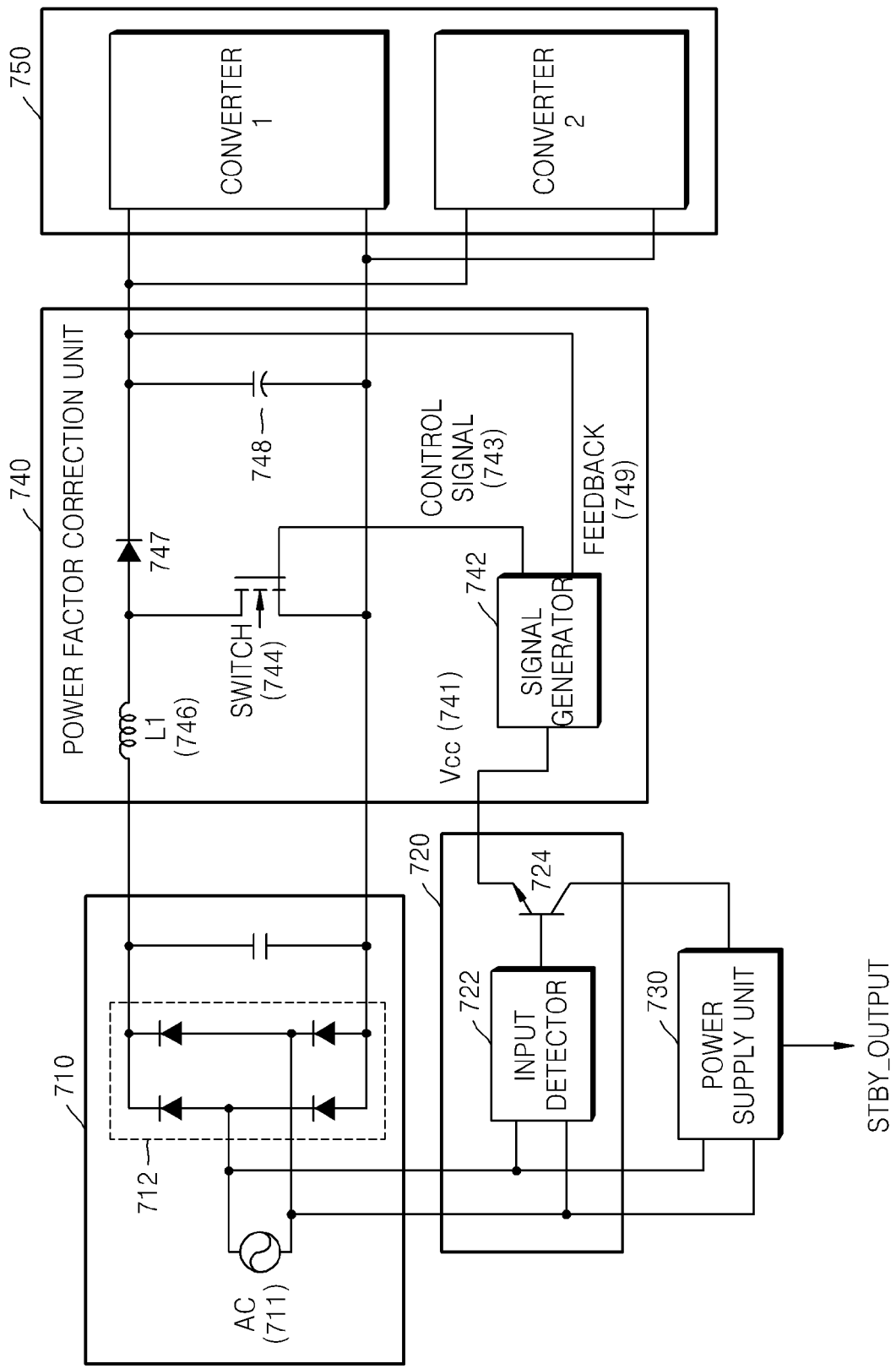
FIG. 7 is a block diagram of a power factor improving apparatus for preventing saturation according to another exemplary embodiment of the present invention.

FIG. 7 is a block diagram of a power factor improving apparatus for preventing saturation according to another exemplary embodiment of the present invention. Referring to FIG. 7, the power factor improving apparatus for preventing saturation includes an input unit 710, a saturation prevention unit 720, a power supply unit 730, a power factor correction unit 740, and a converter 750.

The input unit 710 receives an input power 711 from an external power supply. While the input power 711 is denoted to be AC power in the present exemplary embodiment, this is only exemplary and the input power is not limited to being AC power in the present invention. The AC power 711 is rectified by a rectifier 712 included in the input unit 710. The rectifier 712 can use a bridge circuit.

The saturation prevention unit 720 controls the power factor correction unit 740 such that a component included in the power factor correction unit 740 does not exceed a rated capacity. In the present exemplary embodiment, the saturation prevention unit 720 detects whether the input power is applied or not and prevents an element included in the power factor correction unit 740 from exceeding the rated capacity because the power factor correction unit 740 cannot detect a time when the input power is applied and a time when the input power is cut. However, it is also possible to prevent saturation by controlling a current and a voltage applied to the power factor correction unit 740 such that the current and the voltage do not exceed the rated capacities of elements included in the power factor correction unit 740.

The saturation prevention unit 720 includes an input detector 722 and a BJT 724. The input detector 722 detects the input of the input power 711 and selectively transfers an output signal to the BJT 724. The output signal has a voltage higher than a voltage for operating the BJT 724.

The BJT 724 outputs a signal applied to a collector thereof to an emitter thereof when the output signal of the input detector 722 is input thereto and blocks the signal from being applied to the collector when the output signal of the input detector 722 is not input thereto.

The power supply unit 730 provides an operating voltage of the power factor correction unit 740. The operating voltage is a DC voltage and thus, when the input power is an AC voltage, the AC voltage is converted into a DC voltage using an AC-DC converter. The operating voltage output from the power supply unit 730 is applied to the collector of the BJT 724. As described above, the output voltage of the power supply unit 730 gradually decreases due to an element such as a capacitor included in the power supply unit 730 even when the input power is cut. The BJT 724 is used in the present exemplary embodiment, other switches such as an FET can be used.

The power factor correction unit 740 receives the output voltage of the power supply unit 730. The power factor correction unit 740 includes a signal generator 742, a switch 744, an inductor 746, a diode 747, and a capacitor 748.

The signal generator 742 receives an input signal and an output voltage 749 of the capacitor 748 through feedback and generates a control signal 743 for controlling the output voltage of the capacitor 748 to reach a target voltage.

The control signal 743 can be a pulse signal and is transmitted to the switch 744. The switch 744 charges the inductor 746 or the capacitor 748 according to the signal 743 generated by the signal generator 742. When the control signal 743 is a pulse signal is in an ON state, the switch 744 is closed and the inductor 746 is charged using the input power 711 input to the input unit 710. When the signal 743 is a pulse signal is in an OFF state, the switch 744 is open and the capacitor 748 is charged using the energy charged in the inductor 746. In this case, the diode 747 prevents the energy charged in the capacitor 748 from being discharged in a backward direction.

The converter 750 receives the voltage of the capacitor 748 and converts the voltage into a desired voltage using a DC-DC converter.

Figure 8:
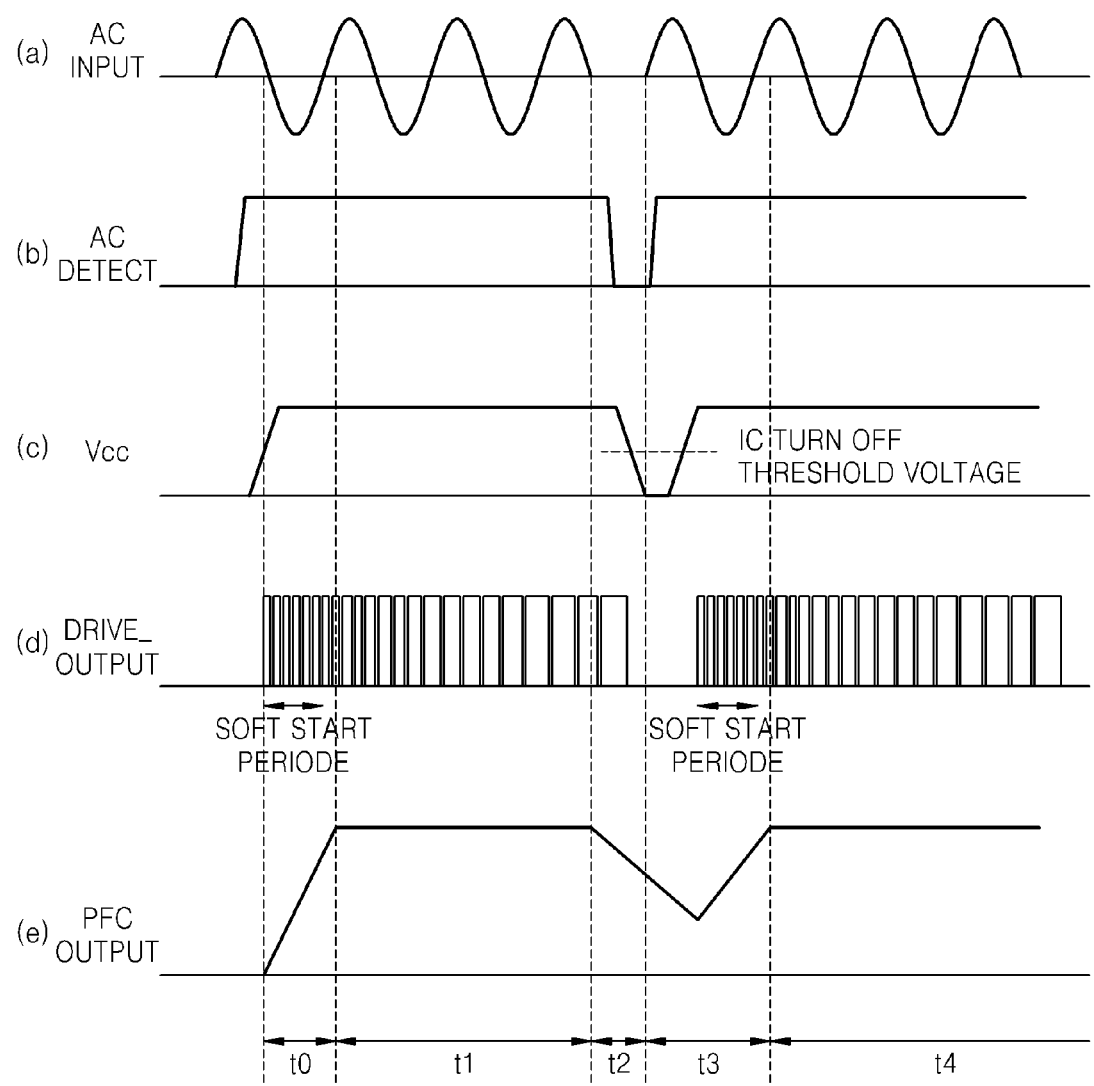
FIG. 8 illustrates signal waveforms for explaining the operation of the power factor improving apparatus for preventing saturation according to an exemplary embodiment of the present invention.

FIG. 8 illustrates signal waveforms for explaining the operation of the power factor improving apparatus for preventing saturation illustrated in FIG. 7 according to an exemplary embodiment of the present invention. (a) FIG. 8 illustrates the input AC power. Referring to (a) of FIG. 8, the AC input power is applied to the power factor improving apparatus for a period T0 through T1 and the supply of the AC input power is cut for a period T2. Then, the input power is applied again for a period T3 through T4. This ON/OFF change in the AC input power can be achieved according to the power supply or a forced operation of a user.

(b) of FIG. 8 illustrates the output signal of the input detector 720 illustrated in FIG. 7. Referring to (b) of both FIGS. 7 and 8, the input detector 720 outputs a DC voltage when it detects the input power and it does not output the DC voltage when it does not detect the input power. Accordingly, the DC voltage is output for the period T0 through T1 and is not output for the period T2. During the period T3 through T4 when the input power is applied again, the DC voltage is output.

(c) of FIG. 8 illustrates the DC voltage applied to the power factor correction unit 740 illustrated in FIG. 7. The DC voltage applied to the power factor correction unit 740 is output from the power supply unit 730, passes through the saturation prevention unit 720 and is transferred to the power factor correction unit 740.

The power supply unit 730 and the saturation prevention unit 720 both output DC voltages for the period T0 through T1 and the DC output voltage of the power supply unit 730 is applied to the power factor correction unit 740 to operate the power factor correction unit 740. During the period T2, the output DC voltage of the power supply unit 730 gradually decreases although the input power is not applied, and thus the output DC voltage of the power supply unit 730 can be higher than a threshold voltage. However, the output voltage of the saturation prevention unit 720 becomes lower than the operating voltage of the BJT 724 because the input power is not applied, and thus the output DC voltage of the power supply unit 730 is not transferred to the power factor correction unit 740.

During the period T3 through T4, the input power is applied again and the saturation prevention unit 720 detects the input power, and thus the BJT 724 is operated and the output DC voltage of the power supply unit 730 is transferred to the power factor correction unit 740.

(d) of FIG. 8 illustrates a signal generated by the signal generator 742 included in the power factor correction unit 740. The signal generated by the signal generator 742 is a pulse signal in the present exemplary embodiment. The signal generator 742 controls the pulse width of the pulse signal based on the input power and the output voltage of the capacitor 748 such that the output voltage of the capacitor 748 reaches the target voltage. However, since there is a large difference between the output voltage of the capacitor 748 and the target voltage in the initial stage of the operation of the power factor correction unit 740, a large current flows to the inductor 746 and damages the inductor 746 when the pulse signal has a large pulse width.

Accordingly, the signal generator 742 performs a soft-start operation in which the pulse width is gradually widened irrespective of the output voltage of the capacitor 748 or performs a start-up operation that starts to generate the pulse signal after the output voltage of the capacitor 748 reaches a predetermined level when the signal generator 742 recognizes the initial operation of the power factor correction unit 740.

During the period T0, the signal generator 742 recognizes the initial operation of the power factor correction unit 740 and performs the soft-start operation. Accordingly, the signal generator 742 gradually increases the pulse width of the pulse signal even when there is a large difference between the output voltage of the capacitor 748 and the target voltage.

During the period T1, the signal generator 742 controls the pulse width of the pulse signal in response to the output voltage of the capacitor 748 such that the output voltage of the capacitor 748 reaches the target voltage. The pulse width is gradually increased and maintained when the output voltage of the capacitor 748 arrives at a predetermined level.

During the period T2, the power factor correction unit 740 does not operate because the output DC voltage of the power supply unit 730 is cut by the saturation prevention unit 720. Accordingly, the signal generator 742 does not generate the pulse signal.

During the period T3, the signal generator 742 recognizes the initial operation of the power factor correction unit 740 again and carries out the soft-start operation. In the related art power factor improving apparatus, the signal generator does not recognize the initial operation of the power factor correction unit and generates the pulse signal having a maximum pulse width, and thus an excessive current flows to the inductor to damage the power factor correction unit. However, exemplary embodiments of the present invention address this problem.

During the period T4, the pulse width of the pulse signal is controlled in response to the output voltage of the capacitor 748 such that the output voltage of the capacitor 748 reaches the target voltage. The pulse width of the pulse signal is gradually increased and maintained when the output voltage of the capacitor 748 reaches a predetermined level.

Figure 9:
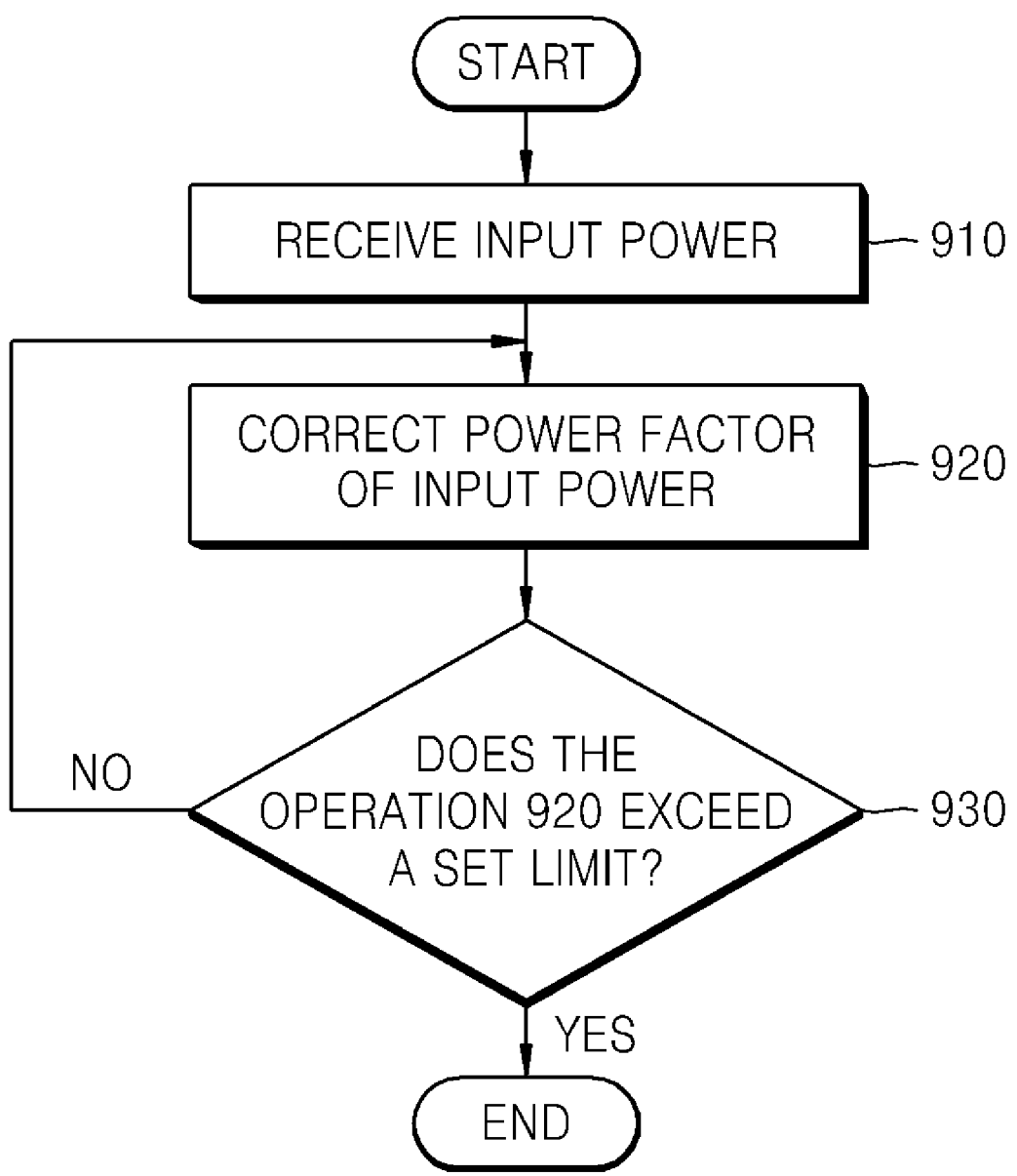
FIG. 9 is a flow chart of a power factor improving method for preventing saturation according to an exemplary embodiment of the present invention.

FIG. 9 is a flow chart of a power factor improving method for preventing saturation according to an exemplary embodiment of the present invention. Referring to FIG. 9, an input power is received in operation 910. When the input power is an AC voltage, the input power can be rectified.

The power factor of the input power is corrected in operation 920. When the voltage and the current of the input power do not have the same phase, a reactive power component increases and a power loss is generated. Accordingly, the phases of the voltage and the current of the input power are controlled to correct the power factor of the input power.

The operation 920 of correcting the power factor of the input power is controlled such that the operation 920 does not exceed a set limit in operation 930. If it is determined that the power factor correction exceeds the limit, the power factor correction is stopped.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media.

Aspects of the present invention may provide a method and apparatus to predict and limit a maximum current flowing through an inductor included in the power factor improvement circuit under the same load condition. Accordingly, the reliability and quality of the power factor improvement circuit may be enhanced. Furthermore, exemplary embodiments of the present invention can produce an inexpensive power factor improvement circuit because the inductor included in the power factor improvement circuit can be made using an inexpensive ferrite material core.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A power factor improving apparatus comprising:
an input unit which receives an input power which is an AC voltage;
a power factor correction unit which generates a switching control signal and corrects a power factor of the input power received by the input unit based on the switching control signal;
a power supply unit which generates a DC voltage from the input power and provides the DC voltage to the power factor correction unit to generate the switching control signal, wherein the power supply unit is configured such that, even when the input power is not received by the input unit, the DC voltage is transferred to the power factor correction unit to generate the switching control signal unless the DC voltage falls below a threshold; and
a saturation prevention unit which controls the power factor correction unit such that the power factor correction unit does not exceed a limit,
wherein the saturation prevention unit comprises:
an input detector which detects whether the input power is received by the input unit; and
a controller which blocks the DC voltage from the power supply unit to the power factor correction unit if the input detector detects that the input power is not received by the input unit, and
wherein the controller controls the power factor correction unit to operate if the input detector detects the input power is received.

2. The power factor improving apparatus of claim 1, wherein the power factor correction unit comprises:
a switch performing a switching operation for storing the input power in a first storage unit and a second storage unit in response to the switching control signal; and a signal generator generating the switching control signal using the DC voltage, and wherein the controller blocks the DC voltage from the power supply unit to the power factor correction unit by blocking the DC voltage from the power supply unit to the signal generator if the input detector detects that the input power is not received by the input unit.

3. The power factor improving apparatus of claim 2, wherein the power factor correction unit comprises:

the first storage unit connected to an output terminal of the input unit; and the second storage unit connected to an output terminal of the first storage unit.

4. The power factor improving apparatus of claim 3, wherein the switch performs a first switching operation such that energy of the input power received by the input unit is stored in the first storage unit if the switching control signal is a first switching control signal, which performs a second switching operation such that the energy of the input power received by the input unit is stored in the second storage unit, using the energy stored in the first storage unit, if the switching control signal is a second switching control signal.

5. The power factor improving apparatus of claim 3, wherein the first storage unit is an inductor and the second storage unit is a capacitor.

6. The power factor improving apparatus of claim 3, wherein, if an amplitude of a current transferred to the first storage unit and the second storage unit is higher than capacities of the first storage unit and the second storage unit, the saturation prevention unit blocks the current from being transferred to the first storage unit and the second storage unit.

7. The power factor improving apparatus of claim 1, further comprising a rectifier which rectifies the input power.

8. The power factor improving apparatus of claim 1, further comprising a power converter connected to an output terminal of the power factor correction unit and converting a DC output voltage of the power factor correction unit into a predetermined voltage.

9. The power factor improving apparatus of claim 1, wherein the controller comprises a transistor, and a first terminal of the transistor receives the DC voltage from the power supply unit and transfers the DC voltage to the power factor correction unit, through a second terminal of the transmitter, to generate the switching control signal.

10. The power factor improving apparatus of claim 9, wherein if the input detector detects that the input power is not received by the input unit, the input detector outputs a corresponding signal to a third terminal of the transistor so that the transistor does not operate, thereby not to transfer the DC voltage to the power factor correction unit.

11. A power factor improving method comprising:

receiving an input power which is an AC voltage;

generating a DC voltage from the AC input power at a power supply unit;

correcting a power factor of the input power in response to a switching control signal based on the DC voltage, at a power factor correction unit, wherein the power supply unit is configured such that, even when the input power is not received, the DC voltage is transferred to the power factor correction unit to generate the switching control signal unless the DC voltage falls below a threshold; and controlling the correcting the power factor such that the corrected power factor does not exceed a limit, and wherein if one determination is made that the input power is not received, the DC voltage from the power supply unit is not transferred to the power factor correction unit to generate the switching control signal, and wherein the controller controls the power factor correction unit to operate if another determination is made that the input power is received.

12. The power factor improving method of claim 11, wherein the correcting the power factor of the input power comprises:

storing the input power in a first storage unit and a second storage unit in response to the switching control signal; and generating the switching control signal using the DC voltage, and wherein if the other determination is made that the input power is not received, the DC voltage from the power supply unit is not transferred to the power factor correction unit by blocking the DC voltage from the power supply unit for the generating the switching control signal.

13. The power factor improving method of claim 12, wherein the correcting of the power factor comprises storing first energy from the input power in the first storage unit in response to a first switching control signal input from an external device.

14. The power factor improving method of claim 13, wherein the correcting of the power factor comprises storing second energy to be stored in the second storage unit using the first energy stored in the first storage unit in response to a second switching control signal input from the external device.

15. The power factor improving method of claim 13, wherein the first storage unit is an inductor.

16. The power factor improving method of claim 13, wherein the controlling the correcting the power factor comprises controlling a current transferred to the first storage unit such that an amplitude of the current does not exceed a capacity of the first storage unit.

17. The power factor improving method of claim 11, wherein the one determination is made that the input power is received if the input power is greater than a predetermined threshold value.

18. The power factor improving method of claim 11, further comprising rectifying the input power.

19. The power factor improving method of claim 11, wherein the controlling the correcting the power factor is performed using a transistor, and a first terminal of the transistor receives the DC voltage from the power supply unit and transfers the DC voltage through a second terminal of the transistor to generate the switching control signal.

20. The power factor improving method of claim 19, wherein if the other determination is made that the input power is not received, a corresponding signal is input to a third terminal of the transistor so that the transistor does not operate, thereby not to transfer the DC voltage to generate the switching control signal.

21. A computer readable recording medium storing a program for executing a method, the method comprising:

receiving an input power which is an AC voltage;

generating a DC voltage from the AC input power at a power supply unit;

correcting a power factor of the input power in response to a switching control signal based on the DC voltage, at a power factor correction unit, wherein the power supply unit is configured such that, even when the input power is not received, the DC voltage is transferred to the power factor correction unit to generate the switching control signal unless the DC voltage falls below a threshold; and controlling the correcting the power factor such that the corrected power factor does not exceed a limit, and wherein if one determination is made that the input power is not received, the DC voltage from the power supply unit is not transferred to the power factor correction unit to generate the switching control signal, and wherein the controller controls the power factor correction unit to operate if another determination is made that the input power is received.

\* \* \* \* \*